United States Patent Office 2,715,001
Patented Aug. 9, 1955

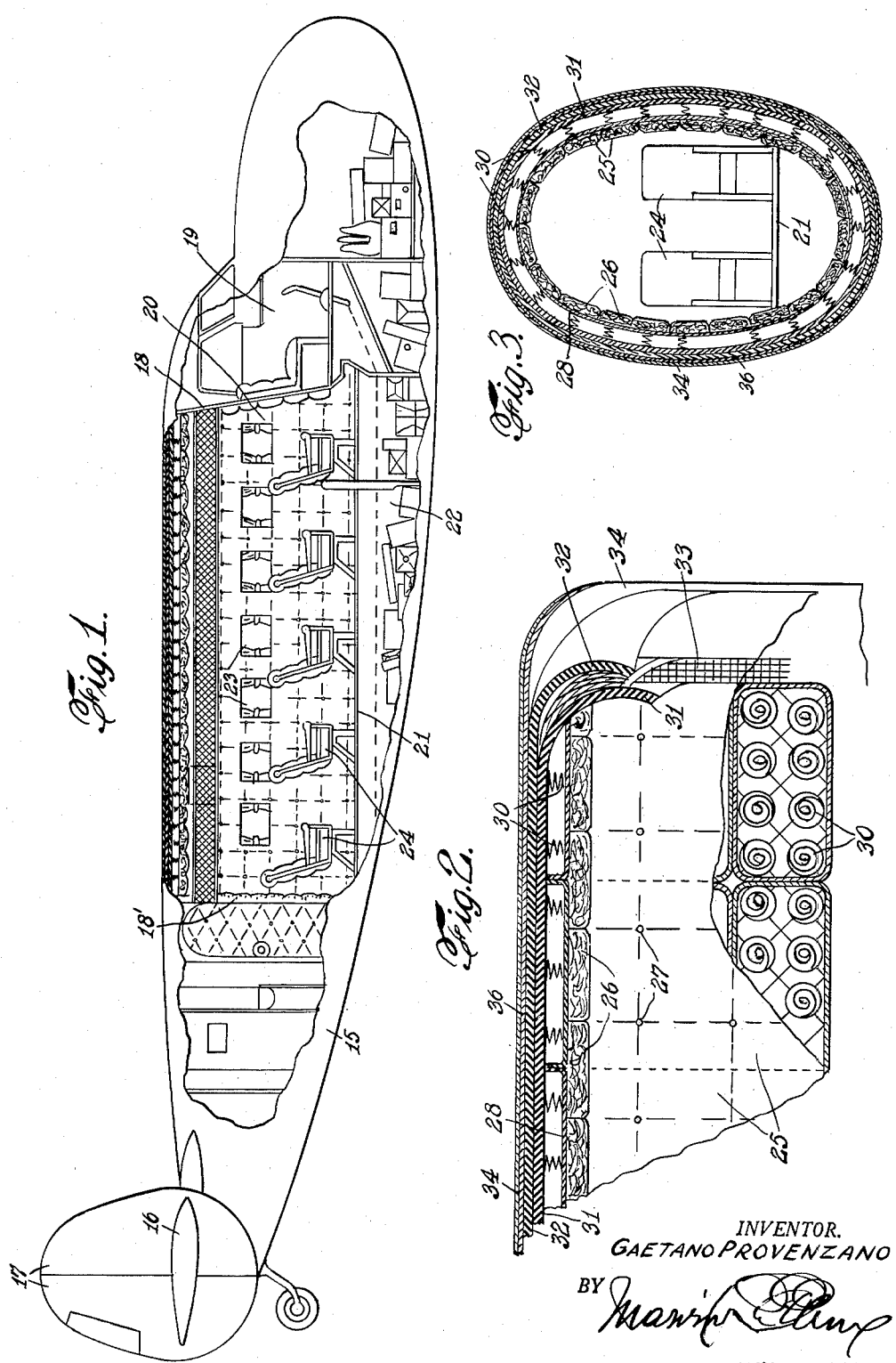

2,715,001

FLYING MACHINE HAVING CUSHIONED CABIN

Gaetano Provenzano, Paterson, N. J.

Application May 7, 1952, Serial No. 286,459

1 Claim. (Cl. 244—118)

This invention relates to aircraft. In particular the invention pertains to aeroplanes and flying machines equipped with propulsion and steering means. More particularly the invention relates to aircraft provided with safety means adapted to increase the protection of passengers and crew in case of an accident such as a crash, fire or other hazard.

Aircraft are used extensively for the transportation of passengers, mail, valuable freight, etc., in times of peace and war and as is well known are liable to collision in the air with other craft, mountains, high buildings and are subject to motor failure and other conditions which may cause the craft to crash.

Aircraft accidents are liable to cause serious injury to the occupants of the plane, to the cargo and to the plane structure, a crash often resulting in damage by fire.

It is an object of this invention to provide means whereby the results of an accident may be minimized, such means including the encasing of the plane body in a resilient armor adapted to resist crushing of the body while affording fire protection. It is also an object to provide the occupant chamber with walls of cushion-like construction for the protection of the passengers from the impact. Also it is an object to so equip this chamber with suitable doors affording access to the interior and for escape therefrom, the said chamber being substantially crash and fire proof, serving the passengers generally and the crew in an emergency.

Further objects and the advantages of the invention will be brought out in the following specification read in conjunction with the drawings which form a part thereof and in which:

Figure 1 is a side elevation, partly in section, of the main portion of an aeroplane showing an embodiment of my invention.

Figure 2 is an enlarged fragmentary sectional view of the safety passenger chamber embodying a form of my invention.

Figure 3 is a vertical cross sectional view of the passenger chamber embodying my invention in modified form.

Referring to the drawing, the numeral 15 designates in general the fuselage or body of an aeroplane, having the usual directional rudders 16 and 17 at the tail end and propelling means (not shown). It is to be understood that the wings (not shown) may be of any well known type. A substantial upright partition 18 extends between the cockpit 19 and the passenger compartment 20, which is provided with a suitable flooring 21 below which is space 22 for freight, baggage, etc. The walls of the chamber are provided with suitable windows 23 and seats 24 for the passengers. Escape end entrance doors for the chamber are to be provided for and located in the partition or bulkhead 18 or in a rear bulkhead 18' of the chamber, or otherwise as may be desired for the safety and convenience of the passengers and crew. The chamber formed within the fuselage is lined with pillow mattresses 25 filled with feathers 26 and secured at intervals by fastenings 27 fixed in the wall, and completely enclosing either all or the upper portion of the passenger chamber. Exteriorly of the feather filled pillows is a layer of rubber sheeting 28, forming the inner covering of a plurality of coiled springs 30 positioned in sections in the manner of bed box springs and overlaid by a thick sheet of rubber 31. A second outer rubber sheet 32 is disposed over the sheet 31 and between these sheets is a re-enforcement element consisting of woven wire fabric 33 which preferably is under strong tension to increase its protective function by resisting deformation. Over the outer sheet 32 is the metal plate of the chamber wall 34. As shown in Fig. 3, a layer of suitable fire resisting material 36, which may be an asbestos sheet, is preferably positioned between the outer metal covering 32 and the resilient inner protective means.

From the above it will be seen that I provide means which is adapted to reduce the shock of a collision and thus save the occupants of the plane from injury and that said means is relatively light in weight and adapted to be designed to take up little space. Also, it will be seen that means are provided for the protection of the occupants against fire which may result during an accident and which may be caused by the combustion of the fuel carried by the plane, the asbestos sheet or other suitable heating resisting material in which the chamber carrying the occupants is encased, affording them protection.

I have illustrated and described preferred embodiments of my invention but it will be understood that changes and modifications may be made in the designing of a structure for carrying out my principle without departing from the spirit of the invention as set forth in the claim.

I claim as my invention:

In an airplane having a fuselage comprising a hollow metal body, a chamber for carrying passengers within said body, cushioning means lining the interior of said chamber, resilient sheeting surrounding said cushion means, second resilient sheeting lining the interior of the airplane body, a plurality of coiled springs intermediate said first and second resilient sheetings, said cushioning means comprising mattresses filled with feathers, said first resilient sheeting comprising rubber, said second resilient sheeting comprising double-ply rubber sheeting, a reinforced element intermediate said double-ply rubber sheeting, said element being tensioned whereby to increase its protective function by resisting deformation, and a layer of fire-resisting material intermediate the hollow body and second resilient sheeting.

References Cited in the file of this patent

UNITED STATES PATENTS

| Number | Name | Date |
|---|---|---|
| 1,349,526 | Niedbala | Aug. 10, 1920 |
| 1,717,533 | Ward | June 18, 1929 |
| 1,803,005 | Castady | Apr. 28, 1931 |
| 1,973,124 | Swan | Sept. 11, 1934 |
| 2,095,626 | Bassett | Oct. 12, 1937 |
| 2,111,326 | Norris | Mar. 15, 1938 |

FOREIGN PATENTS

| Number | Country | Date |
|---|---|---|
| 530,566 | France | Oct. 6, 1921 |
| 599,442 | France | Oct. 19, 1925 |
| 44,480 | France | Nov. 8, 1934 |
|  | Addition to 757,057 | |